United States Patent Office 3,563,989
Patented Feb. 16, 1971

3,563,989
PROCESS FOR THE PRODUCTION OF TETRACHLOROPYRIMIDINE
Hans Holtschmidt, Leverkusen, Herbert Schwarz, Opladen, and Fritz Döring, Odenthal-Globusch, Germany, assignors to Farbenfabriken Bayer Aktiengesellschaft, Leverkusen, Germany, a corporation of Germany
No Drawing. Filed Dec. 4, 1968, Ser. No. 781,278
Claims priority, application Germany, Dec. 14, 1967,
P 16 70 961.8
Int. Cl. C07d 51/36
U.S. Cl. 260—251                    4 Claims

ABSTRACT OF THE DISCLOSURE 2,4,5,6-tetrachloropyrimidine is prepared by heating a mono-, di-, or trichloropyrimidine or mixtures thereof with an excess of chlorine, in the gaseous phase and in the presence of a catalyst, such as nickel, cupric chloride, ferric chloride or activated charcoal.

---

It has been found that 2,4,5,6-tetrachloropyrimidine is obtained from mono-, di- or trichloropyrimidines or mixtures of such partially chlorinated pyrimidines in a high yield and without the formation of secondary products by heating gaseous, partially chlorinated pyrimidine together with an excess of chlorine at temperatures of about 350 to 650° C., preferably 400 to 500° C., in a flow pipe. The reaction is advantageously carried out in such a manner that the gaseous, partially chlorinated pyrimidine is conducted at the above mentioned temperatures, together with excess chlorine in a flow pipe via a contact, for example quartz pieces, which may also be a catalyst or which may possess catalyst properties, for example a nickel catalyst in the form of nickel rings; copper chloride ($CuCl_2$) on a carrier, such as pumice; iron chloride ($FeCl_3$) on a carrier, such as silica gel; or activated charcoal.

Most of the partially chlorinated pyrimidines used for the present process are known from the literature; they can, moreover, be produced by ring closure of suitable nitrogen-containing aliphatic compounds, in some cases under chlorinating conditions. There are obtained, for example, 4,5-dichloro- and 4,5,6-trichloro-pyrimidine by treating dimethyl-aminopropionitrile, at temperature of 0-250° C., with an excess of chlorine under ultra-violet irradiation and, under the same conditions, 2,4,5-trichloropyrimidine from N - methyl-N-chlorocarbonyl-3-aminopropionitrile.

These and other partially chlorinated pyrimidines, such as 2,4,6 - trichloropyrimidine, 2,4 - dichloro - 6 - methylpyrimidine and 2-methyl-4,6-dichloropyrimidine are suitable to be used for the new process by themselves or in any mixture with one another. It is self-evident that it is also possible to use mixtures of partially chlorinated pyrimidines, e.g., 2,4,6-trichloropyrimidine, with the tetrachloropyrimidine. Mixtures of this kind are obtained in other processes for producing tetrachloropyrimidine and can be converted by a simple and inexpensive method of operation, i.e., without the otherwise necessary separation of partially chlorinated pyrimidines, into pure 2,4,5,6-tetrachloropyrimidine.

In comparison with a chlorination in the liquid phase, a special advantage of the new process is afforded by the fact that secondary products, as are obtained, for example, in the production of 4,5,6-trichloropyrimidine, such as trichloromethyl-isocyanide dichloride, are destroyed, in the case of the chlorination according to the invention, in the gaseous phase (formation of carbon tetrachloride) so that it is not necessary to use pre-purified products for the chlorination.

The reaction speed of the chlorination in the gaseous phase depends, with the use of contacts present in the flow pipe, upon the type of the contacts. As is usual with reactions of this kind, contacts of diverse types have a different influence on the reaction speed; this is illustrated for the present process with the following list of individual contacts, preponderantly catalysts:

| Contact | Temperature, ° C. | Contact, gram/litre h. |
|---|---|---|
| Nickel rings | 465 | 71 |
| Quartz pieces | 440 | 45 |
| 5% $CuCl_2$ on pumice | 440 | 100 |
| 10% $CuCl_2$ on pumice | 440 | 130 |
| 3% $FeCl_3$ on silica gel | 470 | 33 |
| Activated charcoal, granulated | 460 | 1,815 |

When activated charcoal is used, a large throughput of the gaseous reaction components necessitates a good heat removal of the exothermal reaction. It is therefore expedient in these cases to carry out the reaction in vertical pipes which are kept at a constant temperature by a circulating gas or by a bath liquid, or by diluting the reaction mixture by the addition of a circulating gas, such as nitrogen or hydrogen chloride. It is also possible to dilute the starting product with tetrachloropyrimidine so that the reaction mixture can absorb part of the reaction heat.

Quite generally, the term flow pipe is understood in a broad sense within the scope of the present invention. Therein are included pipes and pipe-like reaction devices of a most diverse arrangement, they may be arranged in a straight line, in a bent, meandering or spiral way, through which the gaseous reaction components can flow with a more or less great speed. Within the scope of the invention, also fluidized bed-like arrangements may be included. The flow pipes can also contain various internal fittings, such as conducting metal sheets, Raschig-rings and cooling pipes which may be of advantage for the desired course of the reaction. The flow speed with which the gaseous reaction components are passed through the flow pipe may be kept variable and depends inter alia upon the material of the flow pipe used, the temperature and the desired throughput rate. As mentioned above, an inert gas may also be added to the reaction components for the purpose of dilution.

The gaseous starting products are expediently used in such a proportion that chlorine is present in an excess of at least 50%, advantageously 100%, above the theoretically necessary quantity. Larger excesses are not disadvantageous for the course of the reaction. With a lower chlorine excess the completeness of the chlorination reaction decreases.

The reaction according to the process leads to excellent yields and can be carried out equally satisfactorily also with the use of different contacts. When using an appropriate excess of gaseous chlorine, the reaction product is pure tetrachloropyrimidine in which some chlorine is dissolved. By subsequent degassing, e.g., in a spray-column with a counter-passage of inert gas, such as carbon dioxide or nitrogen, or by briefly heating, optionally under reduced pressure, in an evaporator of any construction, a chlorine-free tetrachloropyrimidine of melting point 67–68° C. is obtained which does not exhibit any detectable impurities.

The temperatures in the following examples are given in degrees centigrade.

EXAMPLE 1

Dry activated charcoal of a 3 mm. diameter is placed into a vertical pipe of quartz material, having a length of 300 mm. and a diameter of 30 mm., surrounded by a metal cylinder of a good heat-conductivity and capable of being heated and cooled, and provided with the necessary feed pipes for chlorine, chloropyrimidine, and with a receiver. An even current of 390 g./h. of 4,5,6-trichloropyrimidine and 300 g./h. of chlorine is passed at 400° over the catalyst bed via a metering pump and a gas-regulating valve. The temperature in the catalyst rises to 500°, and the temperature is maintained by cooling the metal cylinder. The catalysate is collected at 80–100°, the waste gas passed through a reflux condenser kept at 20°, and the solid tetrachloropyrimidine which there separates is melted out from the time to time and added to the reaction product obtained. After degassing at 100° and 20 mm. Hg, the reaction product is free from chlorine and is pure tetrachloropyrimidine melting at 67–68°. The yield amounts to 610 g. tetrachloropyrimidine/h.; M.P. 67–68°.

In the same apparatus as that described in this example, a current of 65 g./h. 2,4 - dichloro - 6 - methylpyrimidine and 213 g./h. chlorine is passed over the catalyst bed at 450°. 70 g./h. of pure tetrachloropyrimidine are obtained.

In the same apparatus as that described in this example, a current of 65 g./h. of 2-methyl-4,6-dichloropyrimidine and 213 g./h. chlorine is passed over the catalyst bed at 450°. 77 g./h. of pure tetrachloropyrimidine are obtained.

EXAMPLE 2

In the same apparatus as that described in Example 1, a current of 390 g./h. of 2,4,6-trichloropyrimidine and 300 g./h. chlorine is passed over the catalyst bed at 450°. 610 g./h. of pure tetrachloropyrimidine are obtained.

EXAMPLE 3

In the same apparatus as that described in Example 1, a current of 390 g./h. of 2,4,5-trichloropyrimidine and 300 g./h. chlorine is passed over the catalyst bed at 450°. 610 g./h. of pure tetrachloropyrimidine are obtained.

EXAMPLE 4

In the same apparatus as that described in Example 1, a current of 230 g./h. of 2,4-dichloropyrimidine and 330 g./h. chlorine is passed over the catalyst bed. The furnace heated to 400° has to be strongly cooled in order to adjust the temperature in the catalyst bed to about 480°. 337 g./h. of tetrachloropyrimidine are formed.

EXAMPLE 5

In the apparatus described in Example 1, a mixture of 79% 2,4,5,6-tetrachloropyrimidine, 11% 4,5,6-trichloropyrimidine and 10% impurities, such as trichloromethyl-isocyanide dichloride, pentachloroethyl-isocyanide dichloride and resin of an unknown composition is placed. A mixture as that obtained in the synthesis of 4,5,6-trichloropyrimidine is passed at 480° at a rate of 400 g./h. together with 100 g./h. chlorine over the bed of activated charcoal. A mixture of tetrachloropyrimidine and carbon tetrachloride is obtained as catalysate, which can readily be worked up by distillatiton to give pure tetrachloropyrimidine. The yield amounts to 368 g./h. of pure tetrachloropyrimidine.

We claim:
1. Process for the production of 2,4,5,6-tetrachloropyrimidine in the gas phase which comprises heating a mono-, di-, or trichloropyrimidine or mixtures thereof, with an excess of chlorine above the theoretically necessary quantity for complete chlorination of said pyrimidines or mixtures thereof, and reacting said chlorine and said pyrimidines or mixtures thereof in the gas phase, at a temperature in the range of 350 to 650° C., and in the presence of a catalyst selected from the group consisting of nickel, copper II chloride, iron III chloride and activated charcoal, said iron and copper catalysts being supported on a carrier selected from the group consisting of pumice and silica gel.

2. The process of claim 1 in which the copper chloride catalyst is supported on pumice and the iron chloride is supported on silica gel.

3. The process of claim 1 in which the process is carried out at a temperature in the range of 400°–500° C.

4. The process of claim 1 in which the chlorine is employed in 50–100% excess.

References Cited

UNITED STATES PATENTS 3,208,990   9/1965   Benz et al. _____ 260—146

ALEX MAZEL, Primary Examiner

R. V. RUSH, Assistant Examiner